United States Patent [19]

Proebstle

[11] 3,859,747

[45] Jan. 14, 1975

[54] FISHING EQUIPMENT HOLDER

[76] Inventor: Robert J. Proebstle, 1222 E. Kensington, Arlington Heights, Ill. 60004

[22] Filed: Aug. 27, 1973

[21] Appl. No.: 391,994

[52] U.S. Cl............................................. 43/54.5 R
[51] Int. Cl............................................ A01k 97/00
[58] Field of Search....... 43/57.5 R, 57.5 A, 54.5 R, 43/54.5 A

[56] References Cited
UNITED STATES PATENTS

| 592,493 | 10/1897 | Klinger | 43/57.5 R |
| 1,999,779 | 4/1935 | Perrine | 43/57.5 R |
| 2,331,215 | 10/1943 | Mincenberg | 43/44.84 |

Primary Examiner—Warner H. Camb
Attorney, Agent, or Firm—Darbo, Robertson & Vandenburgh

[57] ABSTRACT

A support in the form of a panel has a plurality of rings adjacent the top for receiving the wire ends of a fishing tackle unit which includes a weight at the other end with a fishline extending between the ends. Adjacent the bottom of the support are a second group of rings, the top and bottom rings being arranged in pairs with each pair consisting of a respective top and bottom ring. The bottom ring of a pair is positioned to one side of a vertical extending through the top ring. That side of the bottom ring is closed and there is an opening elsewhere in the bottom ring so that the fishing line can be moved in and out of the bottom ring.

3 Claims, 5 Drawing Figures

PATENTED JAN 14 1975
3,859,747
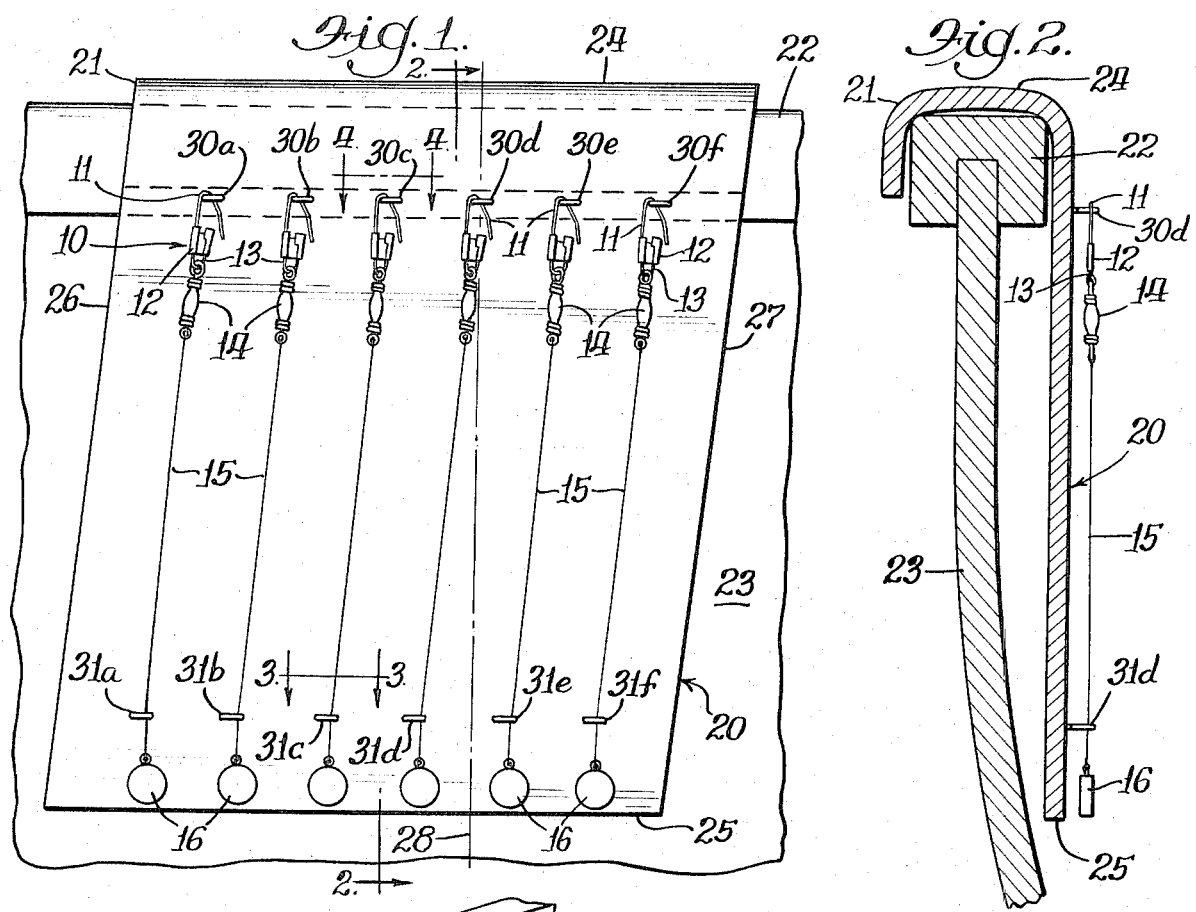
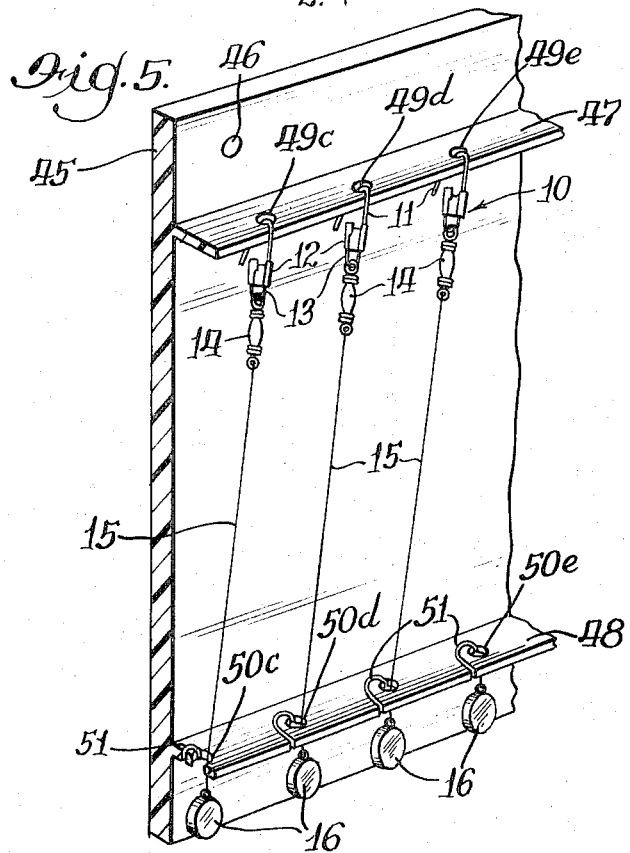
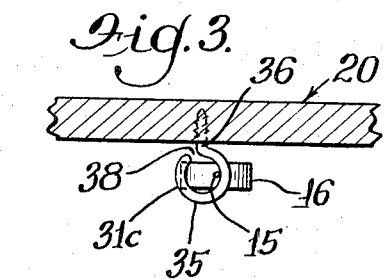
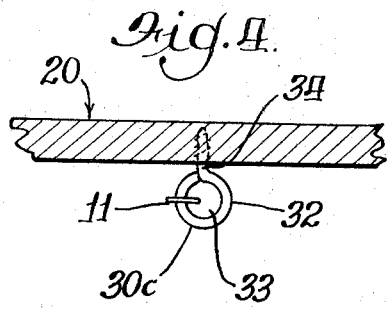

FISHING EQUIPMENT HOLDER

BACKGROUND AND SUMMARY OF THE INVENTION

This invention was devised primarily for use with an item of fishing tackle useful in connection with a "Wolf River" rig; however, those skilled in the art will appreciate other uses for it. A Wolf River rig is used primarily for fishing adjacent the bottom. A weight or sinker on a stub piece of line is connected to the main fishing line (extending from the pole to the lure) at a point a short distance ahead of the lure. This weight holds the lure close to the bottom and generally drags along the bottom. In doing so, it often becomes snagged on a rocky bottom or the like with the result that it breaks off and must be replaced. Replacing these stub lines and weights, particularly if the fisherman is wearing gloves, as in cold weather, can be difficult and time consuming. Often a monofilament line is employed (lighter than the main line so that it will be the stub line that breaks) and a small monofilament line is difficult to tie tight even under good conditions.

To solve this problem, a fisherman may well prepare in advance a number of these stub lines having connectors at one end and the sinker or weight at the other end. The thought is that when the stub line breaks it can be replaced more quickly using one of these preprepared stub lines. However, the ideal is not always quickly achieved, because a collection of these stub lines in a tackle box can get tangled up among themselves as well as among other tackle or gear in the box. The principal object of the present invention is to provide a holdler for these preprepared stub lines which holder will not only keep the lines separate and prevent them from tangling, but will also make them easily and quickly available to the fisherman to replace a broken stub line. Embodiments of the invention incorporate features which make it unlikely that a particular stub line will become disengaged from the holder prior to the time that the fisherman desires to remove it for use. Other objects and advantages will become apparent from the following description.

DESCRIPTION OF THE DRAWINGS

FIG. 1 is an elevational view of an embodiment of the invention;

FIG. 2 is a section taken at line 2—2 of FIG. 1;

FIG. 3 is a fragmentary section as viewed at line 3—3 of FIG. 1;

FIG. 4 is a fragmentary section as viewed at line 4—4 of FIG. 1; and

FIG. 5 is a perspective view of a portion of an alternative embodiment.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The stub lines, previously discussed, may comprise a top connector 10 which works much like a safety pin. A wire 11 extends from the top and can be hooked into the body 12 to form a ring. Alternatively, it may be unhooked from the body, as illustrated, in which case it forms a hook or an engaging portion. The wire also forms a ring 13. Connected to this ring 13 is a swivel 14. A short piece of fishing line 15 extends from the swivel to a sinker or weight 16.

The embodiment of FIGS. 1-4 includes a support, generally 20. It is in the form of a planar body which could be made of wood, plastic or metal. The upper end is in the form of an inverted U thereby defining a hanger 21 by which it may be suspended from the gunwale 22 of the side 23 of a boat. The support 20 is intended to be held in a position such that it has a top 24, a bottom 25 and ends 26 and 27, as respects the vertical (or plumb line) 28.

Adjacent the top 24 are a plurality of engaging devices 30a – 30f. There is a corresponding number of bottom engaging devices 31a – 31f. As the letters a – c suggest, the top engaging devices are all alike, the bottom engaging devices are all alike, and each top and bottom engaging device is one of a respective pair which pair consists of a top engaging device and a bottom engaging device. The distance between the top support device and the bottom support device is less than the distance between the hook defined by wire 11 and the weight 16.

As best seen in FIG. 4, each top engaging device has a ring 32 defining a central opening 33 of a size to receive the wire 11 of the top connector. The ring is connected by an integral post 34 to the support 20.

The bottom engaging device likewise includes a ring 35 which is supported by and spaced outwardly from the front side of the support 20 by means of an integral post 36. The ring 35 defines a central opening. The ring is not fully closed and has an aperture 38 which extends from the outside of the ring to the central opening.

As to each pair of an upper and a lower support device, the lower support device is off to one side of a vertical extending through the upper support device. This is illustrated with respect to the pair consisting of 30d and 31d. It will be noted that the vertical 28 (considering the normal orientation of the apparatus) extends through the upper device 30d and is spaced from the right side of the ring 35 of the lower device 31d. This adjacent side of ring 35 is always a closed side of the ring. Thus, as the weight 16 pulls down on the line 15 it acts to hold the line 15 against that closed side of the ring. In the best embodiment of the invention, the opposite side of the ring is also closed and the opening 38 is at approximately that portion of the ring closest to the support 20. In this arrangement there is the least likelihood of the line 15 becoming accidentally dislodged from the ring 35.

In use, the fisherman would prepare a number of the stub lines in the manner illustrated and described. Each stub line would be hung on a top engaging device 30 and the line put through the central opening of the respective lower engaging device. This latter operation is easily performed by moving the line through the aperture 38 after the top has been hung on the top engaging device. When the apparatus is full, it will normally be transported in the FIG. 1 orientation with respect to the vertical; as for example, a fisherman trailering a boat will leave the support hung on the boat.

FIG. 5 illustrates an alternative embodiment formed as an integral unit of molded plastic. Here there is a support 45 which has holes 46 therethrough. Nails or screws may be inserted through these holes to suspend the support. As an integral part of the support there are an upper ledge 47 and a lower ledge 48. The upper ledge has a plurality of openings 49c, 49d, etc., therein. The plastic material of the upper ledge immediately surrounding each opening serves as a ring defining the opening, which ring is spaced outwardly from the support 45. The lower ledge 48 has a plurality of openings 50c, 50d, 50e, etc. Each lower opening is associated with a respective upper opening and is offset from the vertical with respect to that upper opening (as previously described). The plastic material about each lower opening in effect forms a ring surrounding that opening, which ring is spaced outwardly from the front face of the support 45. Each lower opening has an associated J-shaped slot 51 which defines an aperture extending through that ring from the lower opening to the exterior of the ring, i.e., to the front edge of the ledge 48.

I claim:

1. An apparatus for holding a plurality of a given item of fishing tackle having an engaging portion at one end and a weight at the other end with a fishline therebetween, said engaging portion including a hook-shaped wire, said apparatus comprising:

a support having a top, a bottom and two ends and adapted to be mounted so that a vertical has approximately a predetermined orientation between the top and the bottom, said support including means for use in mounting said support with said orientation, a first plurality of engaging devices adjacent the top of the support and secured thereto and a second plurality of engaging devices adjacent the bottom of the support and secured thereto, said engaging devices being arranged in pairs with a pair consisting of a top engaging device and a bottom engaging device, with respect to a pair of engaging devices:

the distance between the top and bottom engaging device of each pair being less than the distance from said engaging portion of said item to said weight, the top engaging device being readily engageable and disengageable with said engaging portion, said top engaging device being a ring having a central opening for receiving said hook-shaped portion, the bottom engaging device being offset in the direction of one of said ends from the vertical which extends downwardly from the top engaging device, the bottom engaging device comprising a ring having a side thereof adjacent said vertical extending downwardly from the top engaging device, said ring having a central opening larger than the diameter of said fishline and a side aperture smaller than the central opening and larger than the diameter of said fishline for moving said line into and out of said central opening, said side aperture being spaced away from said adjacent side of said ring.

2. An apparatus for holding a plurality of a given item of fishing tackle having an engaging portion at one end and a weight at the other end with a fishline therebetween, said apparatus comprising:

a support having a top, a bottom and two ends and adapted to be mounted so that a vertical has approximately a predetermined orientation between the top and the bottom, said support including means for use in mounting said support with said orientation, a first plurality of engaging devices adjacent the top of the support and secured thereto and a second plurality of engaging devices adjacent the bottom of the support and secured thereto, said engaging devices being arranged in pairs with a pair consisting of a top engaging device and a bottom engaging device, with respect to a pair of engaging devices:

the distance between the top and bottom engaging device of each pair being less than the distance from said engaging portion of said item to said weight, the top engaging device being readily engageable and disengageable with said engaging portion, the bottom engaging device being offset in the direction of one of said ends from the vertical which extends downwardly from the top engaging device, the bottom engaging device comprising a ring having a side thereof adjacent said vertical extending downwardly from the top engaging device, said ring having a central opening larger than the diameter of said fishline and a side aperature smaller than the central opening and larger than the diameter of said fishline for moving said line into and out of said central opening, said side aperture being spaced away from said adjacent side of said ring, said bottom engaging device being spaced outwardly from a side of said support, said side aperture being approximately in the portion of the ring closest to said side of the support.

3. An apparatus as set forth in claim 2, wherein said engaging devices are integral with said support, with the engaging devices and support being formed of plastic.

* * * * *